United States Patent Office 2,944,074
Patented July 5, 1960

2,944,074

ESTERS OF 2-CARBAMYLPHENYL PHOSPHATE

Frank Ratcliffe Atherton, Welwyn Garden City, England, assignor to Hoffman-La Roche Inc., Nutley, N.J., a corporation of New Jersey No Drawing. Filed May 20, 1957, Ser. No. 660,044

Claims priority, application Great Britain May 31, 1956

8 Claims. (Cl. 260—461)

This invention relates to esters of 2-carbamylphenyl phosphate. More particularly, the compounds of the invention may be represented by the following structural formula (I)
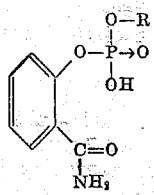

wherein R represents alkyl, phenyl, substituted phenyl, aralkyl and substituted aralkyl.

Compounds represented by the above structural formula form ammonium salts and alkali metal salts, for example, potassium and sodium salts, and these salts are also included within the scope of the invention.

Alkyl groups represented by R in Formula I above are preferably lower alkyl groups such as methyl, ethyl, propyl, isopropyl, etc. Substituted phenyl groups represented by R are preferably lower alkyl-phenyl radicals such as p-methylphenyl, o-methylphenyl, etc. Aralkyl groups and substituted aralkyl groups represented by R in Formula I are preferably benzyl and alkyl substituted benzyl, such as p-methylbenzyl, respectively.

The compounds of this invention are useful as analgesics, e.g. in the treatment of rheumatic disorders. These compounds may be used in salicylate therapy in the same manner as salicylamide, that is to say, they may be substituted for salicylamide in such therapy offering the advantages of being less toxic and more soluble. The novel compounds may be administered orally, for example in the form of tablets, by combining therapeutic doses with conventional excipients and/or carriers according to accepted pharmaceutical practice.

The novel compounds are synthesized by treating with ammonia a 4H-1,3,2-benzodioxaphosphorin-4-one 2-oxide which contains as a substituent in the 2-position the group O—R, wherein R has the meaning defined above. The ammonium salts thus obtained may be converted into an alkali metal salt or into the free amide by treatment with the appropriate alkali metal hydroxide (while removing the ammonia by air aspiration or conducting the treatment in a vacuum) or by a cationic exchange where the salt is required or by a hydrogen ion exchange where the acid is required. Alternatively, a di-ester of 2-carbamylphenyl phosphate, wherein one ester group contains a benzyl radical and the other ester group contains the group R as defined above, may be debenzylated by treatment with an alkali metal thiocyanate. When R is other than a benzyl group, the diester may be catalytically hydrogenated. The process is carried out in a non-hydrolytic solvent, such as dioxane or diethyl ether. The product obtained may be converted to another salt or to the free amide as described above.

The numbering system used herein for the phosphorin derivatives used as starting materials is indicated by the following formula:

(II)
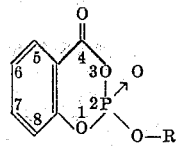

R in the above formula has the same significance as in Formula I.

The starting materials corresponding to Formula II above may be produced e.g. by treating 2-chloro-4H-1,3,2-benzodioxaphosphorin-4-one 2-oxide [described by R. Anschutz in Ann. 228 (1885), 308, and 346 (1906), 286], with a compound of the general formula R—OH, wherein R has the meaning defined above, under substantially anhydrous conditions in the presence of an organic tertiary base. Alternatively, these products may be produced by reacting salicylic acid with an appropriate phosphorodichloridate, such as a methylphenyl phosphorodichloridate, in the presence of an organic tertiary base. The manufacture of some representatives of this class is further described in the examples.

The following examples are illustrative of the invention. All temperatures are in degrees centigrade.

Example 1

A solution of phenol (18.8 g., 0.2 mol) in dry benzene (50 ml.) was added dropwise to a solution of 2-chloro-4H-1,3,2-benzodioxaphosphorin-4-one 2-oxide (43.7 g., 0.2 mol) in dry benzene (150 ml.) containing dry pyridine (15.8 g., 0.2 mol). The temperature was maintained at 5 to 10° by cooling with ice water. After the addition had been completed (30 minutes), the mixture was stored for 2½ hours.

The pyridine hydrochloride which formed was filtered off and washed with boiling toluene (100 ml.) and the combined filtrates were evaporated under water pump vacuum. The residue was distilled under oil pump vacuum, giving a main fraction boiling at 170–174°/0.05 mm. and which solidified on cooling. The 2-phenoxy-4H-1,3,2-benzodioxaphosphorin-4-one 2-oxide thus obtained melted at 85–86°.

Gaseous ammonia was bubbled through a solution of 2-phenoxy-4H-1,3,2-benzodioxaphosphorin-4-one 2-oxide (14.1 g.) in dry dioxane (100 ml.) for 3 hours. The white solid was filtered off, washed with dry ether and air dried. It was then recrystallized by dissolving in boiling methanol (35 ml.), filtering and adding ethyl acetate (200 ml.).

After storing at 0° for 15 hours, the crystalline ammonium salt of 2-carbamylphenyl phenyl phosphate obtained above was filtered off, washed with ethyl acetate and air dried. It had no definite melting point, decomposing slowly above 180°.

Example 2

To a stirred solution of 2-chloro-4H-1,3,2-benzodioxaphosphorin-4-one 2-oxide (182 g., 0.83 mol) in dry benzene (800 ml.) containing dry pyridine (67 ml., 0.83 mol) was slowly added absolute ethanol (48.2 ml., 0.83 mol). The temperature was maintained at 5 to 10° by means of ice-salt cooling. The addition had been completed after 1¼ hours.

After stirring for a further 2 hours at ca. 16° the pyridine hydrochloride which formed was filtered off and washed with benzene. The filtrate was evaporated in vacuo and the residue distilled under oil pump vacuum giving a main fraction boiling at 142–146°/0.3 mm. The 2-ethoxy-4H-1,3,2-benzodioxaphosphorin - 4 - one 2-oxide thus obtained solidified on cooling and melted at 55–56°.

Gaseous ammonia was bubbled through a solution of

2 - ethoxy-4H-1,3,2-benzodioxaphosphorin-4-one 2-oxide (45.6 g., 0.5 mol) in dry ether (300 ml.) for one hour. The supernatant ether was decanted from the separated gum which formed. The latter was then dissolved in ethanol (100 ml.) and ether (120 ml.) was added to incipient turbidity. Crystallization soon began and, as it proceeded, further portions of ether (30 ml. and 40 ml.) were added.

After standing for about 16 hours, the solid was filtered off, washed with ether and air dried. The ammonium salt of ethyl 2-carbamylphenyl phosphate thus obtained melted at 120–122°. The melting point was raised to 121.5 to 123° by recrystallization from ethanol-ether.

Example 3

Dibenzyl 2-carbamylphenyl phosphate (19.85 g., 0.05 mol) was dissolved in dry methyl ethyl ketone (150 ml.). Potassium thiocyanate (7.29 g., 0.75 mol) was added and the mixture was heated under reflux for 3 hours during which time a white solid separated.

After cooling, the potassium salt was filtered off and dissolved in water (100 ml.). The solution was acidified with concentrated hydrochloric acid (15 ml.) and the separated acid was extracted with chloroform (1 x 50 ml., 3 x 25 ml.). The combined extracts were washed with water, dried over sodium sulfate and evaporated under water pump vacuum. The solid residue of benzyl-2-carbamylphenyl phosphate was triturated with dry ether, filtered and air dried. It melted at 111.5 to 112.5°. Recrystallization from methyl ethyl ketone-ethanol-diethyl ether raised the melting point to 115–116°.

Example 4

A solution of salicylic acid (34.5 g.) in a mixture of dry pyridine (39.5 g.) and dry toluene (200 ml.) was stirred and cooled to 10° and a solution of 2-methyl-phenyl phosphorodichloridate (56.25 g.) in dry toluene (25 ml.) was added so that the temperature did not exceed 15°. After the addition had been completed (50 minutes) the mixture was stirred for a further 3 hours.

The pyridine hydrochloride which formed was filtered off and washed with boiling toluene (200 ml.) and the combined filtrates were evaporated under water pump vacuum. The residue was distilled under oil pump vacuum, giving a main fraction boiling at 164–174°/0.3 to 0.4 mm. and which solidified on cooling. The 2-(2'-methyl - phenyl) - 4H-1,3,2-benzodioxaphosphorin-4-one 2-oxide thus obtained melted at 78–82°.

20.3 g. of 2-(2'-methyl-phenoxy)-4H-1,3,2-benzodioxaphosphorin-4-one 2-oxide were treated with gaseous ammonia as described in Example 1. The white solid which formed was filtered off, washed with dry ether and air dried. After crystallization from methanol/ethyl acetate, the ammonium salt of 2-carbamylphenyl-2-methylphenyl phosphate melts at 154.5–155.5°.

Example 5

In a manner similar to Example 4 2-(3'-methyl-phenoxy)-4H-1,3,2-benzodioxaphosphorin-4-one 2 - oxide was prepared by reacting salicylic acid and 3-methyl-phenyl phosphorodichloridate. The product obtained was distilled under oil pump vacuum, giving a main fraction boiling at 182–188°/0.3 mm.

20.3 g. of 2-(3'-methyl-phenoxy)-4H-1,3,2-benzodioxaphosphorin-4-one 2-oxide were treated with gaseous ammonia as described in Example 1. After filtration, washing with dry ether, air drying and recrystallization from isopropanol/ethyl acetate, there was obtained the ammonium salt of 2-carbamylphenyl-3-methylphenyl phosphate. It had a melting point of 127–133°.

Example 6

2-(4'-methyl-phenoxy) - 4H - 1,3,2 - benzodioxaphosphorin-4-one 2-oxide was prepared in a manner similar to the corresponding (2'-methyl-phenoxy)-derivative described in Example 4. It had a boiling point of 168–176°/1.5 mm. and a melting point of 111–114°.

20.3 g. of 2-(4'-methyl-phenoxy)-4H-1,3,2-benzodioxaphosphorin-4-one 2-oxide were treated with gaseous ammonia as described in Example 1. After crystallization from methanol/ethyl acetate there was obtained the ammonium salt of 2-carbamylphenyl-4-methyl-phenyl phosphate. It had a melting point of 180–183°.

Example 7

A solution of 3,5-dimethyl-phenyl phosphorodichloridate (47.8 g.) in dry toluene (100 ml.) was stirred and cooled to 10° and a solution of salicylic acid (27.6 g) and dry triethyl amine (56 ml.) in dry toluene (150 ml.) was added so that the temperature did not exceed 15°. Further proceeding as described in Example 1 gave a viscous oil showing a boiling point of 182–184° which slowly solidified on cooling. The 2-(3,5' - dimethyl-phenoxy) - 4H-1,3,2-benzodioxaphosphorin-4-one 2-oxide thus obtained melted at 69–74°.

30.4 g. of the above product were treated with gaseous ammonia as described in Example 1. The reaction product consisting of the ammonium salt of 2-carbamyl-phenyl-3,5-dimethylphenyl phosphate showed after crystallization from ethanol/ethyl acetate a melting point of 161–163°.

Example 8

2-(2'-isopropyl-5'-methyl - phenoxy) - 4H-1,3,2-benzodioxaphosphorin-4-one 2-oxide was prepared in a manner similar to the corresponding 3',5'-dimethyl-phenoxy derivative in Example 7. It boiled at 180–184°/0.1 mm. and melted at 56–59.5°.

33.2 g. of the above product were treated with gaseous ammonia as described in Example 1. The reaction product consisting of the ammonium salt of 2-carbamyl-phenyl-2-isopropyl - 5 - methyl - phenyl phosphate showed after crystallization from ethanol/ethyl acetate a melting point of 170–173°.

Example 9

2-(2',6'-dimethyl-phenoxy) - 4H-1,3,2-benzodioxaphosphorin-4-one 2-oxide was prepared in a manner similar to the corresponding 3',5'-dimethyl-phenoxy derivative in Example 7. It boiled at 176–180°/0.06 mm. and melted at 95–100°.

30.4 g. of the above product were treated with gaseous ammonia as decscribed in Example 1. The reaction product melted after crystallization from methanol/ethyl acetate at 186.5–188.5°.

I claim:

1. A member of the group consisting of compounds represented by the formula

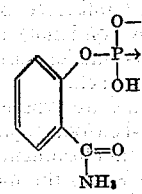

wherein R represents a member of the group consisting of lower alkyl, phenyl, lower alkyl phenyl, di-lower alkyl phenyl benzyl and lower alkyl benzyl and alkali metal and ammonium salts thereof.

2. A compound represented by the formula

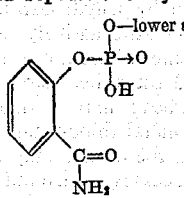

3. The ammonium salt of 2-carbamylphenyl phenyl phosphate.

4. The ammonium salt of 2-carbamylphenyl 2-isopropyl-5-methyl-phenyl phosphate.

5. A compound represented by the formula

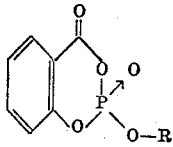

wherein R represents a member of the group consisting of lower alkyl, phenyl, lower alkyl phenyl, di-lower alkyl phenyl benzyl and lower alkyl benzyl.

6. 2-phenoxy-4H-1,3,2-benzodioxaphosphorin-4-one 2-oxide.

7. 2-ethoxy-4H-1,3,2-benzodioxaphosphorin-4-one 2-oxide.

8. Ammonium salts of the compound of claim 2.

References Cited in the file of this patent

Cherbuliez et al.: Helv. Chim. Acta. 39 1461–1467 (1956), cited in Chemical Abst. 51 3448h (1957).

UNITED STATES PATENT OFFICE
CERTIFICATE OF CORRECTION

Patent No. 2,944,074                          July 5, 1960

Frank Ratcliffe Atherton

It is hereby certified that error appears in the above numbered patent requiring correction and that the said Letters Patent should read as corrected below.

In the grant, lines 2 and 12, and in the heading to the printed specification, line 4, name of assignee, for "Hoffman-La Roche Inc." read -- Hoffmann-La Roche Inc. --; column 4, line 18, for "2-(3,5′-" read -- 2-(3′,5′- --; lines 57 to 60, the lower right-hand portion of the formula should appear as shown below instead of as in the patent:

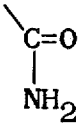

same column 4, line 63, and column 6, line 2, for "phenyl benzyl", each occurrence, read -- phenyl, benzyl --; column 5, line 2, for "5-methyl-phenyl" read -- 5-mentylphenyl --; column 6, line 7, for "compound" read -- compounds --.

Signed and sealed this 29th day of November 1960.

(SEAL)
Attest:

KARL H. AXLINE                         ROBERT C. WATSON
Attesting Officer                    Commissioner of Patents